(12) United States Patent
Kim et al.

(10) Patent No.: US 12,463,216 B2
(45) Date of Patent: Nov. 4, 2025

(54) SULFUR-CARBON COMPOSITE AND LITHIUM SECONDARY BATTERY COMPRISING SAME

(71) Applicant: LG ENERGY SOLUTION, LTD., Seoul (KR)

(72) Inventors: Bong Soo Kim, Daejeon (KR); Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/731,673

(22) Filed: Jun. 3, 2024

(65) Prior Publication Data

US 2024/0332528 A1  Oct. 3, 2024

Related U.S. Application Data

(63) Continuation of application No. 17/043,897, filed as application No. PCT/KR2019/011707 on Sep. 10, 2019, now Pat. No. 12,027,704.

(30) Foreign Application Priority Data

Sep. 20, 2018 (KR) .......................... 10-2018-0112636
Sep. 9, 2019 (KR) .......................... 10-2019-0111292

(51) Int. Cl.
*H01M 4/00* (2006.01)
*H01M 4/36* (2006.01)
(Continued)

(52) U.S. Cl.
CPC .......... *H01M 4/583* (2013.01); *H01M 4/366* (2013.01); *H01M 4/38* (2013.01); *H01M 4/608* (2013.01);
(Continued)

(58) Field of Classification Search
CPC .......... H01M 4/583; H01M 4/02; H01M 4/36; H01M 4/38; H01M 4/60; H01M 10/0525; Y02E 60/10
See application file for complete search history.

(56) References Cited

U.S. PATENT DOCUMENTS 10,916,803 B1 * 2/2021 Henslee ................ H01M 4/382
2009/0305135 A1 12/2009 Shi et al.
(Continued)

FOREIGN PATENT DOCUMENTS

CN  102792498 A  11/2012
CN  103474633 A  12/2013
(Continued)

OTHER PUBLICATIONS

Yang, Lithium Sulphur Battery and Preparation Method Thereof, May 2015, See the Abstract. (Year: 2015).*
(Continued)

*Primary Examiner* — Tiffany Legette
*Assistant Examiner* — Monique M Wills
(74) *Attorney, Agent, or Firm* — Birch, Stewart, Kolasch & Birch, LLP

(57) ABSTRACT

A positive electrode containing a sulfur-carbon composite and a lithium secondary battery including the same are discussed. More specifically, a network-shaped coating layer including a conductive polymer on a surface of the sulfur-carbon composite, and thus the conductivity of the sulfur-carbon composite is enhanced and also, lithium ions move freely, and accordingly, when applied to lithium secondary batteries, the sulfur-carbon composite can enhance the performance of batteries.

7 Claims, 4 Drawing Sheets

(51) Int. Cl.
    *H01M 4/38*     (2006.01)
    *H01M 4/583*     (2010.01)
    *H01M 4/60*     (2006.01)
    *H01M 10/0525*     (2010.01)
    *H01M 4/02*     (2006.01)

(52) U.S. Cl.
    CPC .. *H01M 10/0525* (2013.01); *H01M 2004/028* (2013.01)

(56) References Cited

U.S. PATENT DOCUMENTS

| | | |
|---|---|---|
| 2012/0007028 A1 | 1/2012 | Hwang et al. |
| 2016/0087266 A1* | 3/2016 | Muldoon .......... H01M 4/38 429/213 |
| 2017/0125802 A1 | 5/2017 | Kisailus |

FOREIGN PATENT DOCUMENTS

| | | | |
|---|---|---|---|
| CN | 104157829 A | 11/2014 | |
| CN | 104659406 A * | 5/2015 | |
| CN | 106159221 A | 11/2016 | |
| KR | 10-2014-0122886 A | 10/2014 | |
| KR | 10-2016-0134092 A | 11/2016 | |
| KR | 10-2018-0058605 A | 6/2018 | |
| WO | WO-2013002415 A1 * | 1/2013 | .......... H01M 10/052 |

OTHER PUBLICATIONS

Abe et al., Nonaqueous-Electrolyte Secondary Battery and Positive-Electrode Sheet Therefor, Jan. 2013, See the Abstract. (Year: 2013).*

Anilkumar et al., "Layered sulfur/PEDOT:PSS nano composite electrodes for lithium sulfur cell applications", Applied Surface Science, 2018, vol. 442, pp. 556-564, Total 30 pages.

Extended European Search Report for European Application No. 19863939.5, dated Apr. 9, 2021.

Gao et al., "Facile preparation of an ultrathin sulfur-wrapped polyaniline nanofiber composite with a core-shell structure as a high performance cathode material for lithium-sulfur batteries", J. Mater. Chem. A, 2015, vol. 3, pp. 7215-7218.

Huang et al., "Nanofiber Formation in the Chemical Polymerization of Aniline: A Mechanistic Study", Angew. Chem. Int. Ed. 2004, vol. 43, pp. 5817-5821.

International Search Report (PCT/ISA/210) issued in PCT/KR2019/011707 mailed on Dec. 20, 2019.

Jin et al., "Mesoporous carbon/sulfur composite with polyaniline coating for lithium sulfur batteries", Solid State Ionics, 2013, vol. 262, pp. 170-173.

Jin et al., Nanometre Carbon Sulphur Composite Material for Lithium-Sulphur Battery, Nov. 2016, 2016.

Li et al., "A Polyaniline-Coated Sulfur/Carbon Composite with an Enhanced High-Rate Capability as a Cathode Material for Lithium/Sulfur Batteries", Advanced Energy Materials, 2012, vol. 2, No. 10, pp. 1238-1245.

Lou et al., "A porous N-doped carbon aggregate as sulfur host for lithium-sulfur batteries", Ionics, 2019, vol. 25, pp. 2131-2138.

Wang et al., "C-S@PANI composite with a polymer spherical network structure for high performance lithium-sulfur batteries", Phys.Chem.Chem. Phys., 2016, vol. 18, pp. 261-266.

Wang et al., "Dual core-shell structured sulfur cathode composite synthesized by a one-pot route for lithium sulfur batteries," Journal of Materials Chemistry A, vol. 1, 2013, pp. 1716-1723.

Xue et al., "In-situ polyaniline modified cathode material Li[Li0.2Mn0.54Ni0.13Co0.13]O2 with high rate capacity for lithium ion batteries", J. Mater. Chem. A, 2014, vol. 2, pp. 18613-18623, Total 13 pages.

* cited by examiner

[Figure 1]
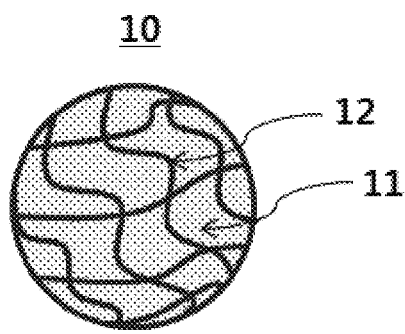
[Figure 2]
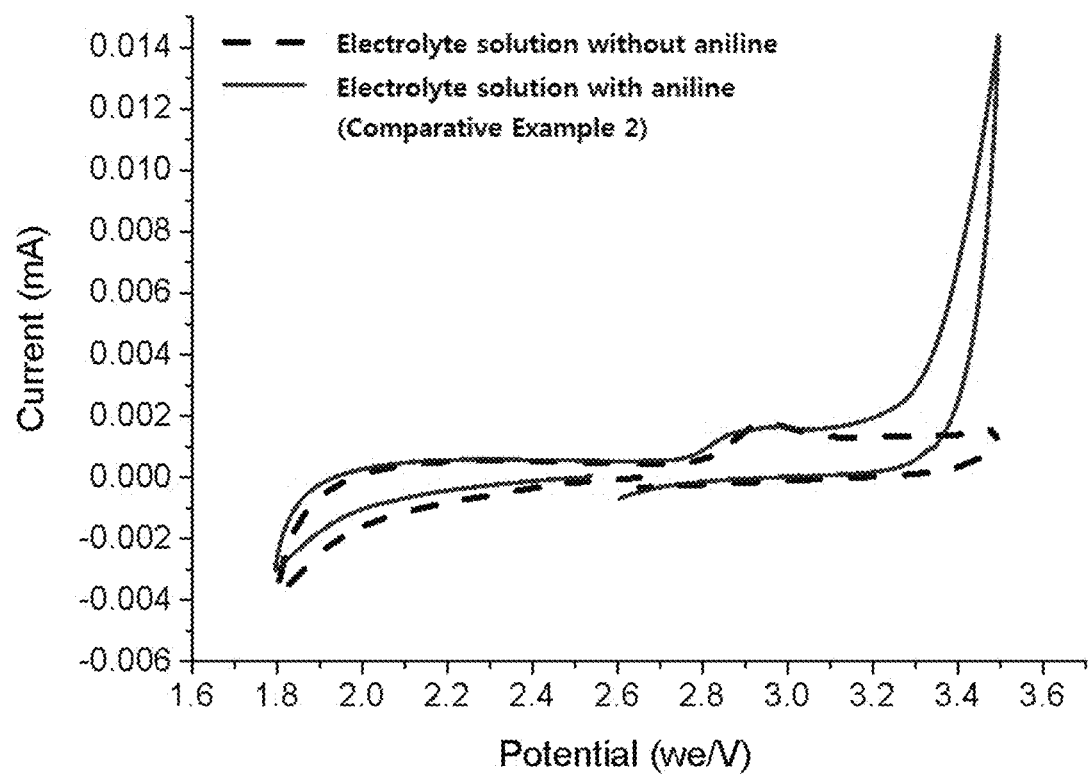

【Figure 3a】
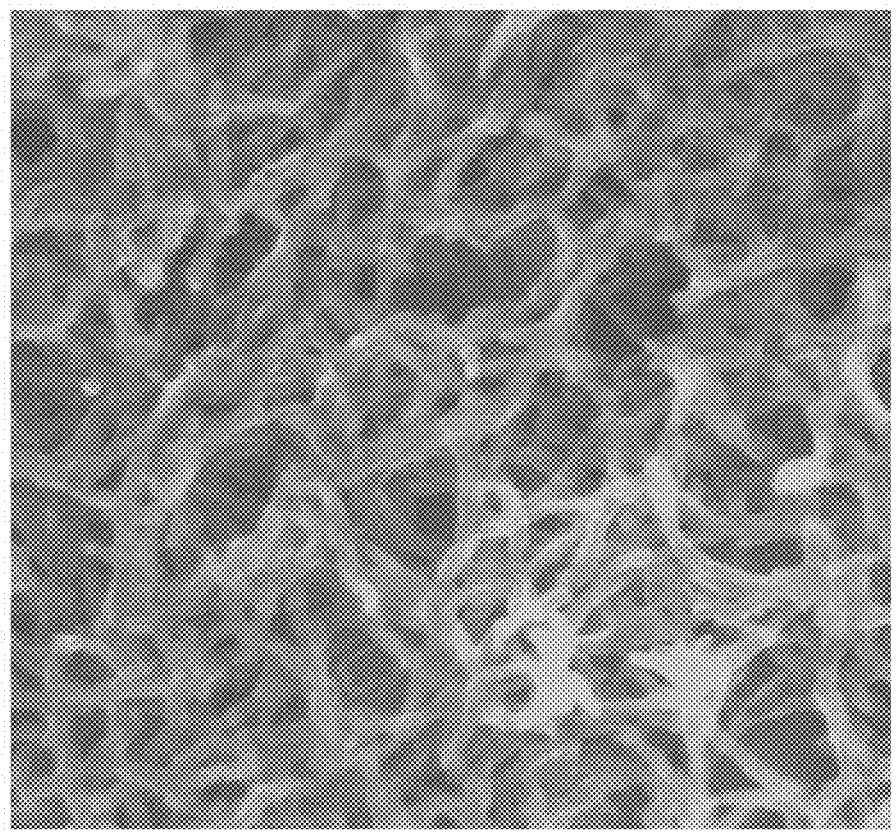
【Figure 3b】
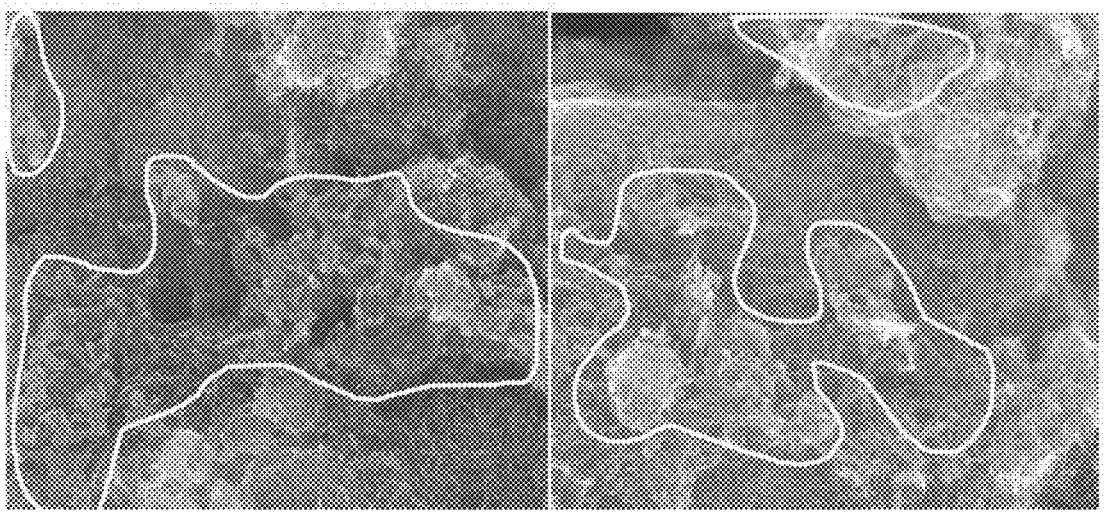

[Figure 4]
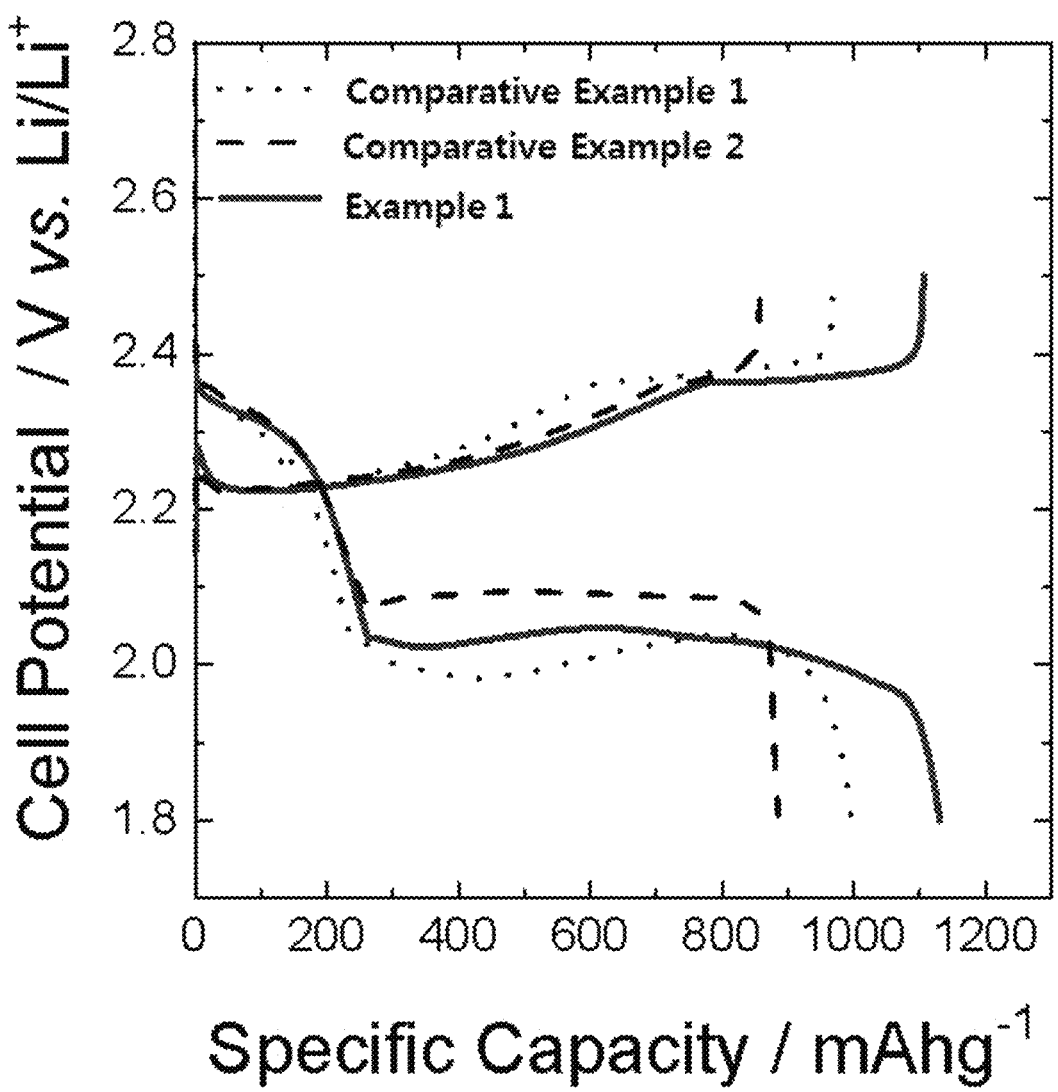

[Figure 5]
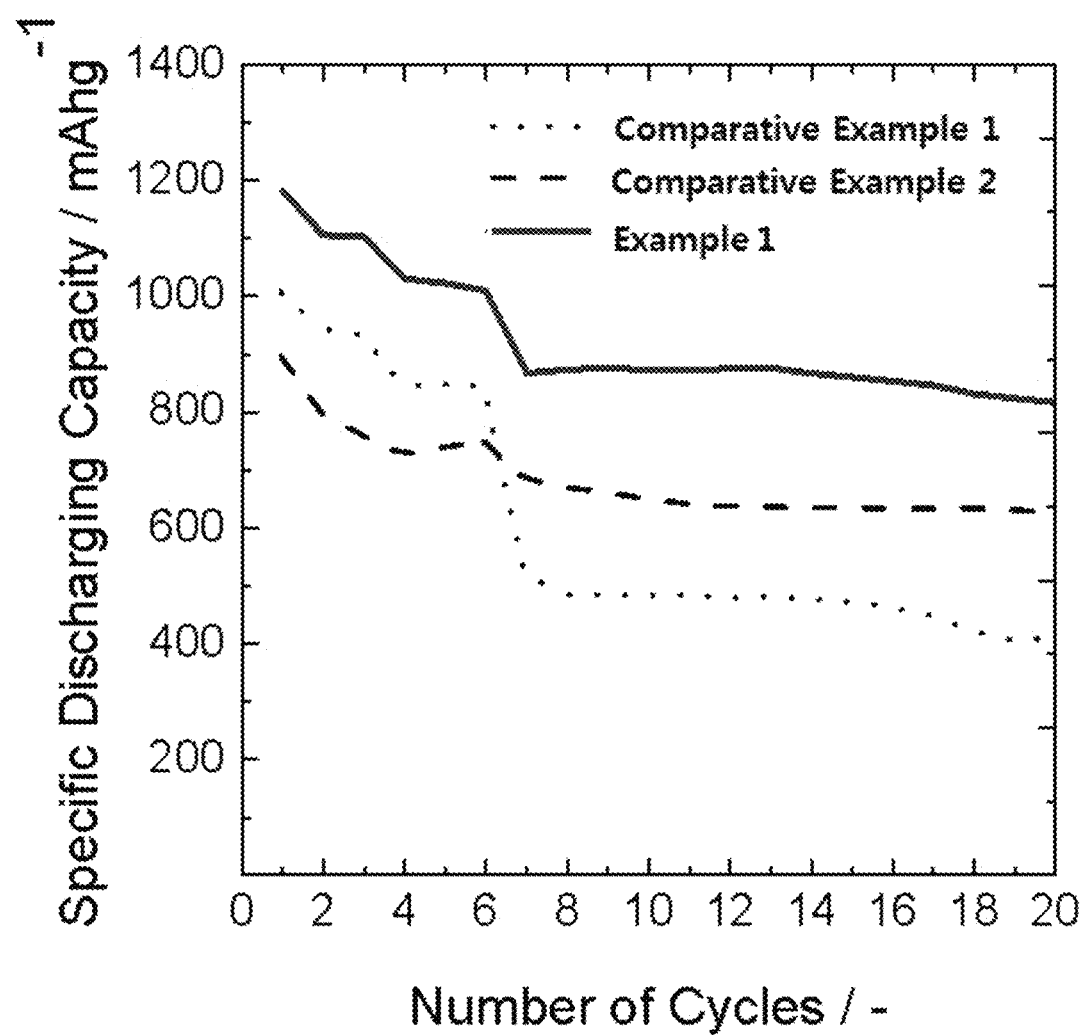

SULFUR-CARBON COMPOSITE AND LITHIUM SECONDARY BATTERY COMPRISING SAME

RELATED APPLICATION DATA

This application is a Continuation of application Ser. No. 17/043,897, filed on Sep. 30, 2020, which is the National Phase under 35 U.S.C. § 371 of International Application No. PCT/KR2019/011707, filed on Sep. 10, 2019, which claims priority under 35 U.S.C § 119 (a) to Korean Patent Application No. 10-2018-0112636 filed on Sep. 20, 2018 and Korean Patent Application No. 10-2019-0111292 filed on Sep. 9, 2019, the entire contents of which are expressly incorporated herein by reference.

TECHNICAL FIELD

The present invention relates to a sulfur-carbon composite applicable to a positive electrode material for a lithium secondary battery and a lithium secondary battery comprising the same.

BACKGROUND ART

Recently, with the rapid development in the field of electronic devices and electric vehicles, the demand for secondary batteries is increasing. In particular, with the trend toward miniaturization and weight reduction of portable electronic devices, there is a growing demand for secondary batteries having a high energy density that can cope with them.

Among the secondary batteries, a lithium-sulfur battery is a secondary battery that uses sulfur-based compounds having a sulfur-sulfur bond as a positive electrode active material, and uses alkali metals such as lithium, carbon-based materials in which intercalation and deintercalation of metal ions such as lithium ions occur, or silicon or tin, which forms an alloy with lithium, as a negative electrode active material. Specifically, during the discharging which is a reduction reaction, as the sulfur-sulfur bond is cut off, the oxidation number of sulfur decreases, and during the charging which is an oxidation reaction, as the oxidation number of sulfur increases, the sulfur-sulfur bond is re-formed. Through this oxidation-reduction reaction, electrical energy is stored and generated.

In particular, sulfur used as a positive electrode active material in lithium-sulfur batteries has a theoretical energy density of 1,675 mAh/g, and thus has a theoretical energy density of about five times higher than the positive electrode active material used in conventional lithium secondary batteries, thereby enabling batteries to express high power and high energy density. In addition, since sulfur has the advantage of being cheap and rich in resources and thus being readily available and environmentally friendly, sulfur is drawing attention as an energy source not only for portable electronic devices but also for medium and large devices such as electric vehicles.

Sulfur is an insulator, and thus is mainly used as a composite with carbon which is a conductive material. The higher the sulfur content in the positive electrode is, the higher the energy density is, but the smaller the amount of conductive material is. Therefore, there was a problem that electromotive force is lost due to an increase in the electrochemical overvoltage.

In order to solve this problem in the lithium-sulfur secondary battery, a technique of coating a material capable of adsorbing polysulfide on a positive electrode material or introducing it into a component such as a separator or a negative electrode within the battery has been proposed. In addition, the results of research on coating an electrically conductive polymer on a positive electrode material have been reported.

For example, Jun Jin et al. (SOLID STATE IONICS 262 (2014) pp. 170-173) discloses a positive electrode for a lithium-sulfur secondary battery comprising a mesoporous sulfur-carbon composite coated with polyaniline which is an electrically conductive polymer.

In addition, Guo-Chun Li. et al. (ADVANCED ENERGY MATERIALS 2012, 2, pp. 1238-1245) also discloses a positive electrode active material for a lithium-sulfur secondary battery comprising a sulfur-carbon black composite coated with a polyaniline which is an electrically conductive polymer.

However, in the case of sulfur-carbon composites suggested in these documents, there is a problem that since polyaniline is coated in the form of a thin film, the movement of lithium ions becomes difficult.

Therefore, there is an urgent need to develop a technology that allows lithium ions to move smoothly while improving the conductivity of sulfur-carbon composites.

NON-PATENT DOCUMENT (Non-Patent Document 1) Jun Jin et al., SOLID STATE IONICS 262 (2014) pp. 170-173
(Non-Patent Document 2) Guo-Chun Li. et al., ADVANCED ENERGY MATERIALS 2012, 2, pp. 1238-1245

DISCLOSURE

Technical Problem

As a result of various studies to solve the above problems, the present inventors have confirmed that the conductivity of the sulfur-carbon composite was improved if an electrically conductive polymer is introduced into the sulfur-carbon composite by coating in the form of allowing lithium ions to pass through the surface of the sulfur-carbon composite, while using polyaniline nanofiber as the electrically conductive polymer. In addition, the present inventors have confirmed that the sulfur-carbon composite coated with the polyaniline nanofiber has an improved adsorption rate for polysulfide and the lithium ion is smoothly moved between the coated polyaniline nanofibers, thereby improving battery performance.

Therefore, one embodiment of the present invention is to provide a sulfur-carbon composite in which an electrically conductive polymer coating layer is formed in a form that enables the movement of lithium ions.

Another embodiment of the present invention is to provide a lithium secondary battery including a sulfur-carbon composite having an electrically conductive polymer coating layer having a form that enables the movement of lithium ions.

Technical Solution

In order to achieve the above objects, one embodiment of the present invention provides a sulfur-carbon composite comprising an electrically conductive network-type polymer coating layer.

The electrically conductive polymer may be at least one selected from the group consisting of polyaniline, polypyrrole, polythiophene, poly(3,4-ethylenedioxythiophene), polyacetylene, polydiacetylene, poly(thiophenevinylene), polyfluorene, and derivatives thereof.

The shape of the electrically conductive polymer may be at least one selected from the group consisting of nanofibers, nanowires, nanorods, and nanotubes.

The sulfur-carbon composite may comprise sulfur particles comprising at least one carbon particle therein, and carbon particles positioned on some or all of the surface of the sulfur particles.

The weight ratio of sulfur and carbon may be 6:4 to 9:1.

The content of the electrically conductive polymer may be 0.1 to 10% by weight based on the total weight of the sulfur-carbon composite comprising an electrically conductive polymer coating layer.

Also, in the sulfur-carbon composite, the sulfur may be at least one selected from the group consisting of sulfur ($S_8$), Li Sn (n is a real number satisfying n≥1), organic sulfur compound and carbon-sulfur polymer [$(C_2S_x)_n$, wherein x is a real number of 2 to 50 and n is a real number satisfying n≥2].

The carbon may be any one selected from the group consisting of graphite, graphene, Super P, carbon black, Denka black, acetylene black, Ketjen black, channel black, furnace black, lamp black, thermal black, carbon fiber, carbon nanofiber, carbon nanotube, carbon nanowire, carbon nano ring, carbon fabric, and fullerene ($C_{60}$).

Another embodiment of the present invention also provides a positive electrode comprising the sulfur-carbon composite.

The present invention also provides a lithium secondary battery comprising the sulfur-carbon composite.

Advantageous Effects

According to the sulfur-carbon composite according to the present invention, since an electrically conductive polymer coating layer is introduced to absorb polysulfide that leaching from the positive electrode when applied to a lithium-sulfur secondary battery, the phenomenon of reduction in lifetime may be prevented, which arises as the polysulfide is dissolved in the electrolyte solution and moved to the negative electrode.

In addition, when polysulfide is adsorbed on the sulfur-carbon composite, a conductive structure is formed together with carbon, thereby improving utilization rate of sulfur.

In addition, in the sulfur-carbon composite, an electrically conductive polymer coating layer may be introduced, thereby improving conductivity.

In addition, in the sulfur-carbon composite having the electrically conductive polymer coating layer, since the electrically conductive polymer coating layer is formed by the electrically conductive polymer nanofiber, a space in which lithium ions may be moved can be secured, and thus the lithium ions may be smoothly moved.

In addition, when applying the sulfur-carbon composite comprising an electrically conductive polymer coating layer formed by the electrically conductive polymer nanofiber to the positive electrode of the lithium-sulfur secondary battery, the performance of the lithium-sulfur secondary battery may be improved.

DESCRIPTION OF DRAWINGS

FIG. 1 is a diagram of a sulfur-carbon composite comprising an electrically conductive polymer coating layer according to the present invention.

FIG. 2 is a graph showing a correlation between electric potential and current when a charging voltage is applied to an electrolyte solution with aniline and an electrolyte solution without aniline according to Comparative Example 2.

FIGS. 3a and 3b are scanning electron microscopy (SEM) images of the polyaniline nanofiber synthesized in Preparation Example 1 and the polyaniline nanofiber coating layer formed on the surface of the sulfur-carbon composite prepared in Example 1, respectively.

FIG. 4 is a graph showing the first discharging curve as a result of the evaluation of the coin cells of the lithium-sulfur secondary batteries prepared in Example 1, and Comparative Examples 1 and 2, respectively.

FIG. 5 is a graph showing cycle-discharging capacity curves of lithium-sulfur secondary batteries prepared in Example 1, and Comparative Examples 1 and 2, respectively.

BEST MODEL

Hereinafter, the present invention will be described in more detail to aid in understanding the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Sulfur-Carbon Composite

One embodiment of the present invention relates to a sulfur-carbon composite comprising an electrically conductive polymer coating layer.

FIG. 1 is a diagram of a sulfur-carbon composite comprising an electrically conductive polymer coating layer according to the present invention.

Referring to FIG. 1, the sulfur-carbon composite 10 (having the electrically conductive polymer coating layer) may be one in which an electrically conductive polymer coating layer 12 is formed on the surface of the sulfur-carbon composite 11.

The electrically conductive polymer forming the electrically conductive polymer coating layer 12 may be any one selected from the group consisting of polyaniline, polypyrrole, polythiophene, poly(3,4-ethylenedioxythiophene), polyacetylene, polydiacetylene, poly(thiophenevinylene), polyfluorene, and derivatives thereof, and preferably the electrically conductive polymer may be polyaniline.

In addition, the shape of the electrically conductive polymer coating layer 12 may be a network-type. In this case, the network-type means that the coating layer formed on the surface of the sulfur-carbon composite is not formed on the entire surface of the sulfur-carbon composite, but is formed in a net shape so that a part of the surface of the sulfur-carbon composite may be exposed. In the electrically conductive network-type polymer coating layer 12, a space is formed in a portion where a part of the surface of the sulfur-carbon composite is exposed, so there is an advantage that lithium ions can move freely through the space.

As such, in order to form the electrically conductive polymer coating layer in the form of a network-type, the electrically conductive polymer may have one or more nanostructure shapes selected from the group consisting of nanowires, nanorods, and nanotubes. Preferably, the electrically conductive polymer may have a nanofiber shape, in which case it may be advantageous to form a network-type coating layer.

In addition, when the electrically conductive polymer has a nanofiber shape, the diameter of the nanofiber may be 10 nm to 1 μm, preferably 20 nm to 500 nm, and more preferably 50 nm to 200 nm. If the diameter of the nanofiber is less than the above range, the effect of improving the conductivity of the sulfur-carbon composite may be insignificant. If the diameter of the nanofiber is more than the above range, the space formed in the coating layer formed as a network-type may be narrowed, thereby making it difficult to move lithium ions.

The content of the electrically conductive polymer may be 0.1 to 10% by weight, preferably 0.5 to 7% by weight, and more preferably 1 to 5% by weight based on the total weight of the sulfur-carbon composite comprising an electrically conductive polymer coating layer. If the content of the electrically conductive polymer is less than the above range, the effect of improving the conductivity of the sulfur-carbon composite may be insignificant. If the content of the electrically conductive polymer exceeds the above range, the performance of the battery may be reduced when applied to the battery.

The sulfur-carbon composite 11 may comprise sulfur particles comprising at least one carbon particle therein; and carbon particles positioned on some or all of the surface of the sulfur particles.

In addition, since the sulfur-carbon composite 11 has a structure in which carbon particles are included inside and outside the sulfur particles, and thus sulfur and carbon may be mixed in a uniform ratio, there is an advantage that carbon, which is a conductive material, effectively provides electron conductivity to sulfur.

Also, in the sulfur-carbon composite 11, the sulfur may be at least one selected from the group consisting of sulfur (Se), Li Sn (n is a real number satisfying n≥1), organic sulfur compound and carbon-sulfur polymer [$(C_2S_x)_n$, wherein x is a real number of 2 to 50 and n is a real number satisfying n≥2].

In addition, the carbon may be any one selected from the group consisting of graphite, graphene, Super P, carbon black, Denka black, acetylene black, Ketjen black, channel black, furnace black, lamp black, thermal black, carbon fiber, carbon nanofiber, carbon nanotube, carbon nanowire, carbon nano ring, carbon fabric, and fullerene ($C_{60}$).

In addition, the diameter of the sulfur-carbon composite 11 may be 5 to 100 μm, preferably 10 to 70 μm, more preferably 15 to 60 μm. In this case, the diameter of the sulfur-carbon composite 11 refers to the length of the longest axis in the cross section of the particles of the sulfur-carbon composite. If the diameter is less than the above range, the surface area to be coated by the electrically conductive polymer nanofiber is too large to coat all of the surface areas, so that the effect of the coating may not be exhibited. If the diameter exceeds the above range, the nonuniformity at the time of electrode formation may be increased, which may adversely affect performance.

The weight ratio of sulfur and carbon may be 60:40 to 90:10, preferably 65:35 to 85:15, and more preferably 70:30 to 80:20. If the weight ratio of carbon to sulfur is less than the range, conductivity may be lowered. If the weight ratio of carbon to sulfur is greater than the range, the amount of active material may be reduced, thereby decreasing energy density.

Method for Preparing Sulfur-Carbon Composite

The present invention also relates to a method for preparing a sulfur-carbon composite comprising an electrically conductive polymer coating layer, which comprises the steps of (S1) preparing a concentrated dispersion comprising an electrically conductive polymer; (S2) preparing a sulfur-carbon composite by mixing sulfur powder and carbon material; and (S3) mixing and drying the concentrated dispersion and sulfur-carbon composite to form an electrically conductive polymer coating layer on the sulfur-carbon composite.

Hereinafter, the preparation method of sulfur-carbon composite according to the present invention will be described in more detail for each step.

Step (S1)

In step (S1), it is possible to prepare a concentrated dispersion containing an electrically conductive polymer.

The electrically conductive polymer may have a shape capable of forming a network-type coating layer. Specific types and shapes of the electrically conductive polymers are as described above. Preferably, the electrically conductive polymer may be polyaniline nanofiber.

The concentrated dispersion containing the electrically conductive polymer may be prepared by repeating the process of dispersing and filtering the electrically conductive polymer in water several times.

Step (S2)

In step (S2), sulfur-carbon composite may be prepared by mixing sulfur and carbon.

In this case, sulfur and carbon are in the form of particles, respectively, and specific types and diameters of sulfur and carbon are as described above.

Specifically, sulfur and carbon may be dispersed in an organic solvent, heated, and mixed, while melting sulfur by a melt diffusion method, to form a sulfur-carbon composite.

In this case, the organic solvent may be at least one selected from the group consisting of dimethyl sulfoxide, diethylene glycol methyl ethyl ether, ethylene glycol butyl ether, and 2-butoxyethyl acetate, but is not limited thereto. Organic solvents capable of dispersing sulfur and carbon can be widely used.

In addition, the heating temperature may be equal to or larger than the melting point of sulfur. That is, the heating temperature may be at least 115.21° C., preferably 130 to 200° C., more preferably 150 to 200° C. If the heating temperature is less than the above range, sulfur is not dissolved and sulfur-carbon composite cannot be formed. If the heating temperature exceeds the above range, the sulfur-carbon composite may be denatured, and thus the performance improvement effect of the battery may be insignificant when applied as a positive electrode material of a lithium secondary battery.

Step (S3)

In step (S3), the concentrated dispersion including the electrically conductive polymer obtained in the step (S1), the sulfur-carbon composite and the solvent obtained in the step (S2) can be mixed and dried to form the electrically conductive polymer coating layer on the sulfur-carbon composite.

The solvent may be a solvent having good affinity with the sulfur-carbon composite, and may be at least one selected from the group consisting of water, ethanol, acetone, dichloromethane, and 1-methyl-2-pyrrolidone.

Lithium Secondary Battery

Another embodiment of the present invention also relates to a lithium secondary battery comprising a sulfur-carbon composite as described above. In this case, the sulfur-carbon composite may preferably be included as a positive electrode active material.

The lithium secondary battery according to the present invention may comprise a positive electrode, a negative electrode, a separator interposed therebetween, and an electrolyte.

In the present invention, the positive electrode of the lithium secondary battery may comprise a positive electrode current collector, and a positive electrode mixture layer having a positive electrode active material formed on the positive electrode current collector.

As the positive electrode active material, a lithium-containing transition metal oxide may be preferably used, and for example, may be any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, and $LiFePO_4$ or a mixture of two or more thereof. Also, in addition to these oxides, sulfides, selenides, halides and the like can also be used.

In addition, the positive electrode current collector is not particularly limited as long as it has a high electrical conductivity without causing chemical changes in the relevant battery, and for example, stainless steel, aluminum, nickel, titanium, sintered carbon, or aluminum, or stainless steel surface-treated with carbon, nickel, titanium, silver or the like may be used. In this case, the positive electrode current collector may be formed in various forms such as film, sheet, foil, mesh, net, porous body, foam, or nonwoven fabric having fine irregularities formed on its surface in order to enhance the bonding force with the positive electrode active material.

In the present invention, the negative electrode of the lithium secondary battery may comprise a negative electrode current collector, and a negative electrode mixture layer having a negative electrode active material formed on the negative electrode current collector.

As the negative electrode active material, a carbon material, lithium metal, silicon, tin, or the like, in which lithium ions may be intercalated and deintercalated, may be used. Preferably, a carbon material may be used, and as the carbon material, both low crystalline carbon and high crystalline carbon may be used. The low crystalline carbon is typically soft carbon and hard carbon. The high crystalline carbon is typically natural graphite, Kish graphite, pyrolytic carbon, mesophase pitch-based carbon fiber, meso-carbon microbeads, mesophase pitches, and high-temperature calcined carbons such as petroleum or coal tar pitch derived cokes. In this case, the negative electrode may comprise a binder. The binder may be various kinds of binder polymers such as vinylidene fluoride-hexafluoropropylene copolymer (PVDF-co-HFP), polyvinylidene fluoride, polyacrylonitrile, polymethylmethacrylate, and the like.

In addition, the negative electrode current collector is not particularly limited as long as it has an electrical conductivity without causing chemical changes in the relevant battery, and for example, copper, stainless steel, aluminum, nickel, titanium, sintered carbon, or copper, or stainless steel surface-treated with carbon, nickel, titanium, silver or the like, or aluminum-cadmium alloy may be used. In this case, the negative electrode current collector may be formed in various forms such as film, sheet, foil, net, porous body, foam, or nonwoven fabric, having fine irregularities formed on its surface like the positive electrode current collector.

At this time, the positive electrode mixture layer or negative electrode mixture layer may further comprise a binder resin, an electrically conductive material, a filler, and other additives.

The binder resin is used for the bonding of the electrode active material and the electrically conductive material and for the bonding to the current collector. Examples of such binder resin may comprise polyvinylidene fluoride (PVDF), polyvinyl alcohol, carboxymethylcellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, styrene-butadiene rubber, fluorine rubber, and various copolymers thereof.

The electrically conductive material is used to further improve the electrical conductivity of the electrode active material. The electrically conductive material is not particularly limited as long as it has electrical conductivity without causing chemical changes in the relevant battery, and for example, graphite such as natural graphite or artificial graphite; carbon blacks such as carbon black, acetylene black, Ketjen black, channel black, furnace black, lamp black, and thermal black; electrically conductive fibers such as carbon fiber and metal fiber; carbon fluoride; metal powders such as aluminum powder and nickel powder; electrically conductive whiskers such as zinc oxide and potassium titanate; electrically conductive metal oxides such as titanium oxide; polyphenylene derivative can be used.

The filler is selectively used as a component for suppressing the expansion of the electrode and is not specifically limited as long as it is a fibrous material without causing chemical change in the relevant battery, and for example, includes olefin-based polymers such as polyethylene and polypropylene; and fibrous materials such as glass fiber and carbon fiber.

In the present invention, the separator may be formed of a porous substrate, and the porous substrate may be any porous substrate conventionally used in an electrochemical device. For example, a polyolefin-based porous membrane or a nonwoven fabric may be used as the porous substrate, but it is not particularly limited thereto.

Examples of the polyolefin-based porous membrane may comprise a membrane formed of polyolefin-based polymer, such as polyethylene such as high-density polyethylene, linear low-density polyethylene, low density polyethylene and ultra-high molecular weight polyethylene, polypropylene, polybutylene, and polypentene, alone or a mixture thereof.

The nonwoven fabric may include, in addition to the polyolefin-based nonwoven fabric, for example, a nonwoven fabric formed of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalate alone or a mixture thereof. The structure of the nonwoven fabric may be a spun bond nonwoven fabric or a melt blown nonwoven fabric composed of long fibers.

The thickness of the porous substrate is not particularly limited, but may be 1 to 100 μm, preferably 5 to 50 μm.

The size and porosity of the pores present in the porous substrate are also not particularly limited, but may be 0.001 to 50 μm and 10 to 95%, respectively.

In the present invention, the electrolyte solution may be a nonaqueous electrolyte solution, and the electrolyte salt contained in the nonaqueous electrolyte solution is a lithium salt. The lithium salt is not particularly limited as long as it can be conventionally used in electrolyte solution for a lithium secondary battery. For example, the lithium salt may be at least one selected from the group consisting of LiFSI, $LiPF_6$, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, lithium chloroborane, and 4-phenyl lithium borate.

As the organic solvent contained in the nonaqueous electrolyte solution, those conventionally used in an electrolyte solution for a lithium secondary battery may be used without limitation, and for example, ether, ester, amide, linear carbonate, cyclic carbonate, etc. may be used alone or in combination of two or more. Among them, representatively, carbonate compounds that are cyclic carbonates, linear carbonates, or slurries thereof may be comprised.

Specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a slurry of two or more thereof. Examples of such halides include, but are not limited to, fluoroethylene carbonate (FEC) and the like.

In addition, specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof. Particularly, among the carbonate-based organic solvents, ethylene carbonate and propylene carbonate which are cyclic carbonates are highly viscous organic solvents and have a high dielectric constant, and thus can dissociate lithium salts in the electrolyte much better. When these cyclic carbonates are mixed with linear carbonates with a low viscosity and a low dielectric constant, such as dimethyl carbonate and diethyl carbonate, at a suitable ratio, an electrolyte solution having the higher electrical conductivity can be prepared.

In addition, the ether among the above organic solvents may be, but is not limited to, any one selected from the group consisting of dimethyl ether, diethyl ether, dipropyl ether, methylethyl ether, methylpropyl ether and ethylpropyl ether, or a mixture of two or more thereof.

In addition, the ester among the above organic solvents may be, but is not limited to, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more thereof.

The injection of the non-aqueous electrolyte solution can be performed d at an appropriate stage during the manufacturing process of the electrochemical device, depending on the manufacturing process and required physical properties of the final product. That is, such injection can be carried out before assembling the electrochemical device or in the final stage of assembling the electrochemical device.

In the case of the lithium secondary battery according to the present invention, it is possible to perform laminating or stacking and folding processes of the separator and the electrode, in addition to the winding process which is a general process.

In addition, the shape of the battery case is not particularly limited, and may be of various shapes such as a cylindrical shape, a laminate shape, a square shape, a pouch shape, or a coin shape. The structure and manufacturing method of these batteries are widely known in the art, and thus detailed description thereof will be omitted.

In addition, the lithium secondary battery may be classified into various batteries, such as a lithium-sulfur secondary battery, a lithium-air battery, a lithium-oxide battery, and a lithium all-solid battery, depending on the positive electrode/negative electrode material used.

In addition, the present invention provides a battery module including the lithium secondary battery as a unit cell.

The battery module may be used as a power source of medium or large-sized devices requiring high temperature stability, long cycle characteristics, and high capacity characteristics.

Examples of the medium or large-sized devices may comprise, but are not limited to, a power tool that is powered and moved by an electric motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system.

Lithium-Sulfur Secondary Battery

The sulfur-carbon composite according to the present invention may be applied to a positive electrode of a lithium-sulfur secondary battery, among lithium secondary batteries.

In this case, the lithium-sulfur secondary battery may be a battery including the above sulfur-carbon composite as a positive electrode active material.

The sulfur-carbon composite may exhibit high ion conductivity by securing a migration path of lithium ions to the inside of the pores, and serves as a carrier for sulfur, thereby increasing the reactivity with sulfur, a positive electrode active material, to simultaneously improve the capacity and lifetime characteristics of a lithium-sulfur secondary battery.

Hereinafter, preferred examples are provided to help understanding of the present invention, but the following examples are only for exemplifying the present invention, and it is apparent to those skilled in the art that various changes and modifications can be made within the scope and spirit of the present invention, and such changes and modifications are within the scope of the appended claims.

Preparation Example 1: Synthesis of Polyaniline Nanofiber

The synthesis of polyaniline nanofiber, which is an electrically conductive polymer, was carried out according to Jiaxing Huang et al. (Nanofiber Formation in the Chemical Polymerization of Aniline: A Mechanistic Study Angew. Chem. Int. Ed. 2004, 43, 5817-5821).

Aniline was dissolved in 1M HCl to prepare 100 ml of 0.32 M aniline solution.

Ammonium persulfate was dissolved in 1M HCl to prepare 100 ml of 0.08M ammonium persulfate solution.

The aniline solution and the ammonium persulfate solution were mixed to obtain a mixed solution.

When the mixed solution was formed, the initial reaction was performed while rapidly mixing at room temperature, followed by an additional reaction for 10 hours in the state of the mixed solution, to prepare a polyaniline nanofiber dispersion.

Example 1

(1) Preparation of Sulfur-Carbon Composite (1-1) Preparation of Concentrated Dispersion Containing Electrically Conductive Polymer The polyaniline nanofiber dispersion obtained in Preparation Example 1 was filtered to filter out the polyaniline nanofibers except for the remaining reactants, and then these materials were re-dispersed and re-filtered in water several times to neutralize the pH to 6 or more, thereby obtaining a polyaniline nanofiber concentrated dispersion having a concentration of 5%.

(1-2) Preparation of Sulfur-Carbon Composite

Carbon nanotubes and sulfur were mixed in a weight ratio of 25:75, and sulfur was supported on carbon by melt diffusion at 155° C. to prepare a sulfur-carbon composite.

(1-3) Formation of Electrically Conductive Network-Type Polymer Coating Layer

The concentrated dispersion of polyaniline nanofiber obtained in (1-1), the sulfur-carbon composite obtained in (1-2), and ethanol were mixed at a weight ratio of 1:1:1.

The mixed solution obtained after mixing was dried to remove the solvent, thereby preparing a sulfur-carbon composite having a polyaniline nanofiber coating layer. At this time, the polyaniline contained in the sulfur-carbon composite having the polyaniline nanofiber coating layer is 5% by weight.

(2) Preparation of Positive Electrode

A positive electrode was prepared by forming a positive electrode mixture layer comprising the sulfur-carbon composite on one surface of an Al current collector. At this time, the positive electrode mixture layer was prepared by mixing the sulfur-carbon composite, a polyacrylic acid (PAA) as a binder and carbon black in a weight ratio of 88:7:5 and then dispersing it in water to obtain a slurry, and coating and drying the slurry on one surface of the Al current collector.

(3) Manufacture of Lithium-Sulfur Secondary Battery

A lithium-sulfur secondary battery in the form of a coin cell was prepared using lithium foil having a thickness of 100 μm as a negative electrode, the positive electrode prepared in (2) above, 2-METHF/DME as a solvent of the electrolyte solution, an electrolyte solution containing LiTFSI and $LiNO_3$ (2-METHF: 2-methyltetrahydrofuran, DME: dimethoxyethane), and a polyolefin separator.

Comparative Example 1

A sulfur-carbon composite was prepared in the same manner as in Example 1, except that a polyaniline nanofiber coating layer is not formed.

Comparative Example 2

After preparing a sulfur-carbon composite in which no polyaniline nanofiber coating layer was formed as in Comparative Example 1, aniline was added to the electrolyte solution when the coin cell was manufactured, and a charging voltage was applied to form a polyaniline coating layer in the form of a film on the surface of the sulfur-carbon composite. At this time, the amount of the aniline was added so that the content of the polyaniline is 5% by weight based on the total weight of the sulfur-carbon composite on which the polyaniline coating layer is formed.

FIG. 2 is a graph showing a correlation between electric potential and current when a charging voltage is applied to an electrolyte solution with aniline and an electrolyte solution without aniline according to Comparative Example 2.

Referring to FIG. 2, when aniline is added to the electrolyte solution and the charging voltage is applied, it can be seen that a polyaniline coating layer in the form of a film is formed on the surface of the sulfur-carbon composite. This is due to the principle that when a charging voltage is applied, oxidation of aniline occurs electrochemically at the electrode to polymerize to produce polyaniline. That is, the electrochemical polymerization of polyaniline from aniline can be confirmed from the current increase observed at a voltage of 3.5 V, and the polyaniline coating layer is formed on the surface of the active material (J. Mater. Chem. A, 2014, 2, 18613-18623|18613).

Experimental Example 1: Scanning Electron Microscopy (SEM) Analysis

FIGS. 3a and 3b are SEM images of the polyaniline nanofiber synthesized in Preparation Example 1 and the polyaniline nanofiber coating layer formed on the surface of the sulfur-carbon composite prepared in Example 1.

Referring to FIGS. 3a and 3b, it was confirmed that a coating layer is formed on the surface of the sulfur-carbon composite using polyaniline nanofiber to form a network-type coating layer.

Experimental Example 2: Analysis of Performance Improvement Effect of Lithium-Sulfur Secondary Battery by Porous Carbon Structure Experiments were carried out for the performance of lithium-sulfur secondary batteries in which sulfur-carbon composites prepared in Example 1 and Comparative Example 1 were applied to positive electrodes. Charging/discharging tests were conducted with the manufactured coin cells, and the charging/discharging current densities were evaluated at 0.3 C/0.5 C after three times at 0.1 C/0.1 C and three times at 0.2 C/0.2 C.

FIG. 4 is a graph showing the first discharging curve as a result of the evaluation of the coin cells of the lithium-sulfur secondary batteries prepared in Example 1, and Comparative Examples 1 and 2, respectively, and FIG. 5 is a graph showing cycle-discharging capacity curves of lithium-sulfur secondary batteries prepared in Example 1, and Comparative Examples 1 and 2, respectively.

Referring to FIGS. 4 and 5, it was confirmed that the initial discharging capacity of the lithium-sulfur secondary battery of Example 1 is higher than that of Comparative Example 1, and further, overvoltage in the initial discharge end section is improved and lifetime characteristics are improved.

In addition, it was confirmed that in Comparative Example 2, the overvoltage is partially improved compared to Comparative Example 1, but a polyaniline coating layer in the form of a film is formed, and thus the voltage is decreased at the discharging end, thereby not showing sufficient capacity and exhibiting poor performance compared to Example 1.

In the above, although the present invention has been described by way of limited embodiments and drawings, the present invention is not limited thereto, and it is apparent to those skilled in the art that various modifications and variations can be made within the equivalent scope of the technical spirit of the present invention and the claims to be described below.

DESCRIPTION OF SYMBOL

10: Sulfur-carbon composite comprising an electrically conductive polymer coating layer
11: Sulfur-carbon composite
12: Electrically conductive polymer coating layer

The invention claimed is:

1. A positive electrode comprising a composite comprising:
   a plurality of sulfur-carbon composite particles having a surface; and
   a net-shaped electrically conductive polymer coating layer on the surface of the sulfur-carbon composite particles,
   wherein the net-shaped electrically conductive polymer coating layer is not formed on an entire surface of the sulfur-carbon composite particles, and wherein a part of the surface of the sulfur carbon composite is exposed,
   wherein the net-shaped electrically conductive polymer coating layer comprises nanofibers,
   wherein a diameter of the nanofibers is from 10 nm to 1 µm,
   wherein a content of the electrically conductive polymer is 0.1% by weight to 10% by weight based on a total weight of the sulfur-carbon composite, and
   wherein the electrically conductive polymer comprises polyaniline.

2. The positive electrode according to claim 1, wherein the sulfur-carbon composite comprises:
   sulfur particles comprising at least one carbon particle therein; and
   carbon particles on some or all of a surface of the sulfur particles.

3. The positive electrode according to claim 1, wherein a weight ratio of sulfur and carbon in the sulfur-carbon composite is in a range of 6:4 to 9:1.

4. The positive electrode according to claim 1, wherein the sulfur is at least one selected from the group consisting of sulfur (S8), Li2Sn, wherein n is a real number satisfying n>1, an organic sulfur compound, and a carbon-sulfur polymer of formula (C2Sx)n, wherein x is a real number of 2 to 50 and n is a real number satisfying n>2.

5. The positive electrode according to claim 1, wherein the carbon of the sulfur-carbon composite is at least one selected from the group consisting of graphite, graphene, carbon black, acetylene black, Ketjen black, channel black, furnace black, lamp black, thermal black, carbon fiber, carbon nanofiber, carbon nanotube, carbon nanowire, carbon nano ring, carbon fabric, and fullerene (C60).

6. A lithium secondary battery comprising the positive electrode according to claim 1.

7. The lithium secondary battery according to claim 6, wherein the lithium secondary battery is a lithium-sulfur secondary battery.

* * * * *